(12) United States Patent
Guidati

(10) Patent No.: US 9,121,417 B2
(45) Date of Patent: Sep. 1, 2015

(54) ENERGY STORAGE SYSTEM AND METHOD FOR ENERGY STORAGE

(71) Applicant: ALSTOM Technology Ltd, Baden (CH)

(72) Inventor: Gianfranco Ludovico Guidati, Zürich (CH)

(73) Assignee: ALSTOM Technology Ltd, Baden (CH)

( * ) Notice: Subject to any disclaimer, the term of this patent is extended or adjusted under 35 U.S.C. 154(b) by 79 days.

(21) Appl. No.: 13/946,301

(22) Filed: Jul. 19, 2013

(65) Prior Publication Data

US 2014/0020369 A1   Jan. 23, 2014

(30) Foreign Application Priority Data

Jul. 20, 2012   (EP) .................................... 12177232

(51) Int. Cl.
*F15B 1/027* (2006.01)
*F02C 6/16* (2006.01)

(52) U.S. Cl.
CPC . *F15B 1/027* (2013.01); *F02C 6/16* (2013.01); *F05D 2220/62* (2013.01); *Y02E 60/15* (2013.01)

(58) Field of Classification Search
CPC ........... F15B 1/027; F02C 6/16; Y02E 60/15; F05D 2220/62
USPC ................... 60/659, 327, 415, 670, 727, 650, 60/682–683
See application file for complete search history.

(56) References Cited

U.S. PATENT DOCUMENTS

| | | | | |
|---|---|---|---|---|
| 3,214,938 A * | 11/1965 | Zotos | ............... | 62/402 |
| 5,634,340 A * | 6/1997 | Grennan | ......... | 60/652 |
| 6,027,304 A * | 2/2000 | Arar et al. | ..... | 415/116 |
| 6,685,425 B2 * | 2/2004 | Poccia et al. | ........ | 415/116 |
| 6,848,259 B2 * | 2/2005 | Kelller-Sornig et al. | ....... | 60/727 |
| 7,086,231 B2 * | 8/2006 | Pinkerton | ....... | 60/650 |
| 8,341,964 B2 * | 1/2013 | Finkenrath et al. | ............ | 60/772 |
| 8,347,629 B2 * | 1/2013 | Finkenrath et al. | ............ | 60/659 |
| 8,739,522 B2 * | 6/2014 | Anikhindi et al. | .............. | 60/327 |
| 2005/0109034 A1 * | 5/2005 | Althaus et al. | .................. | 60/772 |
| 2011/0094229 A1 | 4/2011 | Freund et al. | | |
| 2011/0094231 A1 * | 4/2011 | Freund | ............ | 60/727 |
| 2011/0100010 A1 * | 5/2011 | Freund et al. | ................... | 60/659 |
| 2011/0100583 A1 * | 5/2011 | Freund et al. | .................. | 165/10 |
| 2011/0127004 A1 * | 6/2011 | Freund et al. | .................. | 165/45 |
| 2012/0036853 A1 * | 2/2012 | Kidd et al. | ..... | 60/659 |
| 2014/0208730 A1 * | 7/2014 | Kraft | ............... | 60/327 |
| 2014/0238022 A1 * | 8/2014 | Damgen et al. | ................ | 60/659 |
| 2014/0338315 A1 * | 11/2014 | Marks de Chabris | ........... | 60/327 |
| 2015/0096289 A1 * | 4/2015 | Pedretti-Rodi et al. | ........ | 60/327 |

FOREIGN PATENT DOCUMENTS

DE   10 2010055 750   6/2012
GB   2476489   6/2011

* cited by examiner

*Primary Examiner* — Kenneth Bomberg
*Assistant Examiner* — Jason T Newton

(57) ABSTRACT

An energy storage system that includes a compressor for compressing a gas, a thermal energy storage for cooling the gas coming from the compressor to a given temperature by heating a thermal storage medium to store thermal energy and a reservoir for storing the compressed gas. The energy system also includes a heat recuperator for further cooling the gas coming from the compressor and thermal energy storage below the given temperature by heating the gas supplied to the compressor.

15 Claims, 5 Drawing Sheets

Fig. 1
Fig. 2
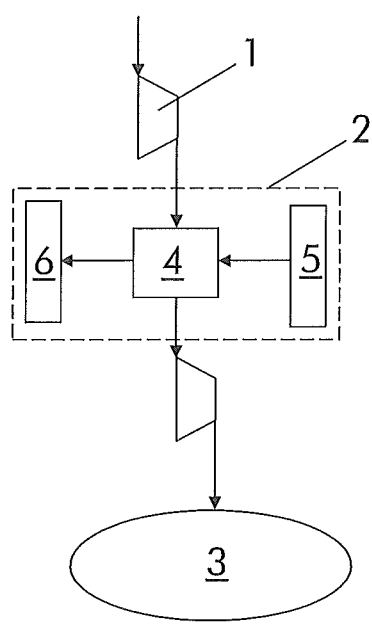
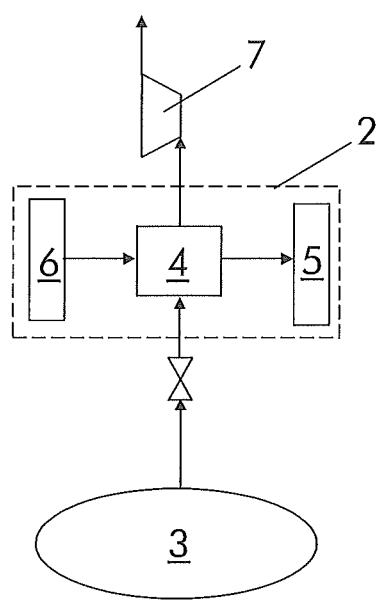

Fig. 3
Fig. 4
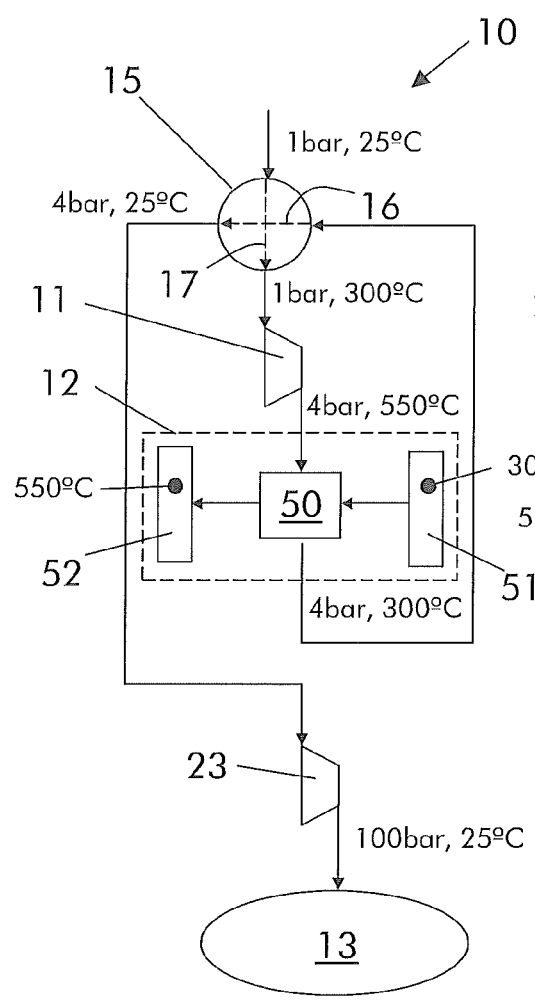
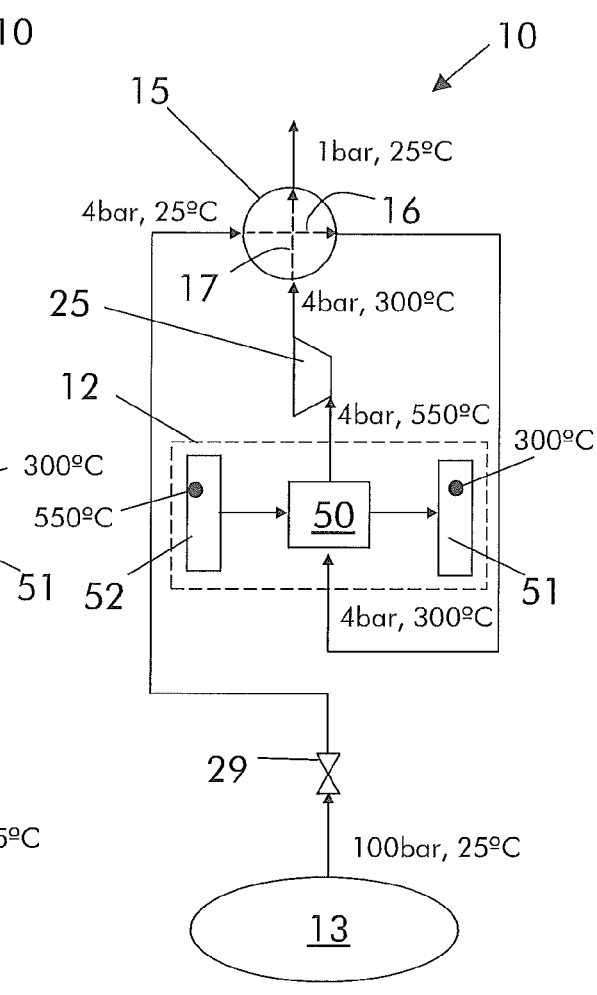

ENERGY STORAGE SYSTEM AND METHOD FOR ENERGY STORAGE

CROSS-REFERENCE TO RELATED APPLICATIONS

This application claims priority to European Application 12177232.1 filed Jul. 20, 2012, the contents of which are hereby incorporated in its entirety.

TECHNICAL FIELD

The present disclosure relates to an energy storage system and method for energy storage.

BACKGROUND

Power plants that use renewable energy can produce a large amount of energy in optimal conditions but the produced amount of energy decreases when the working conditions are not optimal. For example, such power plants can be wind farms or solar plants.

For this reason, these power plants are usually provided with energy storage systems.

Traditional energy storage systems can for example include a pump station for pumping water in a basin; the water can then be conveyed into a water turbine when energy is needed.

Another energy storage system includes a compressor, for compressing a gas (usually air) in a cave. This compressed air is then expanded in an air turbine when energy is needed.

FIGS. 1 and 2 show an example of such an energy storage system.

FIG. 1 shows the components used during compression of the gas and storage thereof in the cave and FIG. 2 shows the components used when energy is needed and the gas stored in the cave is expanded to gather mechanical power.

FIG. 1 shows a compressor 1, thermal energy storage 2 and the cave 3. During operation gas (for example air from the atmosphere) is compressed by the compressor 1 and is then cooled to be then stored in the cave 3.

The thermal energy storage 2 includes a heat exchanger 4, a cold tank 5 and a hot tank 6. The cold tank 5 and hot tank 6 contain a thermal storage medium that is used to store heat. In fact, during compression of the gas, the thermal storage medium passes from the cold tank 5 through the heat exchanger 4 to the hot tank 6, where it is accumulated. While passing through the heat exchanger 4 the thermal storage medium cools the gas and increases its own temperature.

FIG. 2 shows the cave 3 connected to the thermal energy storage 2 that in turn is connected to a turbine 7. During operation the compressed gas contained in the cave 3 is conveyed through the heat exchanger 4 to the turbine 7. When the gas passes through the heat exchanger 4, the thermal storage medium passes from the hot tank 6 through the heat exchanger 4 to the cold tank 5, to increase the temperature of the gas and reduce its own temperature. Within the turbine 7 the high pressure and temperature gas is expanded (to gather mechanical power for example to activate an electric generator) and the exhaust gas is discharged for example into the atmosphere.

The thermal storage medium must be able to conveniently operate in a very broad range of temperatures. For example, in traditional applications the temperature of the cold tank 5 is typically the atmospheric temperature, and the temperature of the hot tank 6 can be as high as about 550° C. or more. In order to have high efficiency, the thermal storage medium must exchange heat over the whole temperature range.

Nevertheless, finding a thermal storage medium that can be conveniently used over the whole temperature range is not easy, because the temperature range is very broad.

SUMMARY

An aspect of the disclosure includes providing an energy storage system and a method that permit energy storage with reduced constrains than those constrains imposed by the properties of the thermal storage medium.

In particular, according to this system and method, the limitations imposed by the thermal storage medium operating temperature can be counteracted.

These and further aspects are attained by providing energy storage system and a method in accordance with the accompanying claims.

BRIEF DESCRIPTION OF THE DRAWINGS

Further characteristics and advantages will be more apparent from the description of a preferred but non-exclusive embodiment of the energy storage system illustrated by way of non-limiting example in the accompanying drawings, in which:

FIGS. 1 and 2 are schematic views of traditional energy storage system;

FIGS. 3 and 4 are schematic views of an embodiment of the energy storage system;

DETAILED DESCRIPTION

Figure 5:
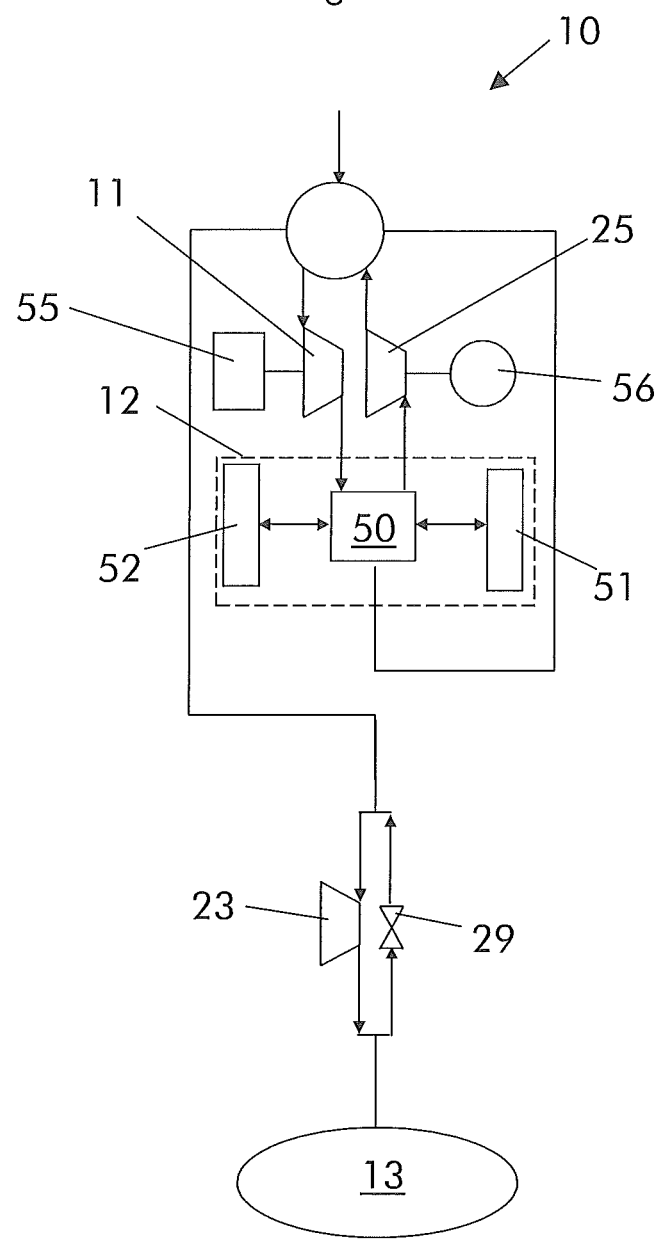
FIG. 5 is a schematic view of the embodiment of the energy storage system including the components shown in FIGS. 3 and 4.

With reference to FIGS. 3-9, the energy storage system 10 comprises a compressor 11 for compressing a gas, a thermal energy storage 12 for cooling the gas coming from the compressor 11 to a given temperature by heating a thermal storage medium to store thermal energy, and a reservoir 13 (such as a cave) for storing the compressed gas.

The thermal energy storage 12 includes a heat exchanger 50, a cold tank 51 and a hot tank 52. The cold tank 51 and hot tank 52 contain a thermal storage medium that is used to store heat.

In addition, the energy storage system 10 also includes a heat recuperator 15 having a path 16 connected to the thermal energy storage 12 and another path 17 connected to the compressor 11.

The heat recuperator 15 can further cool the gas coming from the compressor 11 and thermal energy storage 12 below the given temperature by heating the gas supplied to the compressor 11 (for example this is air coming from the atmosphere).

In a preferred embodiment, the energy storage system 10 has a plurality of thermal energy storages 12a-c and, in addition to the compressor 11a connected between the heat recuperator 15 and the thermal energy storage 12a, it has compressors 11*b-c* connected to the outlet of the thermal energy storages 12*a* or 12*b* and the inlets of the thermal energy storages 12*b* or 12*c*.

The compressors 11*a-c* are used for compressing the gas and the thermal energy storages 12*a-c* for cooling the gas and heating a thermal storage medium, to store thermal energy.

Preferably, the thermal storage medium passes through the thermal energy storages 12*a-c* in parallel.

For example, the thermal energy storages 12*a-c* can have a heat exchanger 50 each and:
- separate hot tanks 52 and cold tanks 51 for each of the thermal energy storages 12*a-c*, or
- common hot tanks 52 and cold tanks 51, or
- combination of the two embodiments above (for example some of the thermal energy storages have separate hot tanks 52 and cold tanks 51 and others have common hot tanks 52 and cold tanks 51.

Between the heat recuperator 15 and the reservoir 13 a further compressor 23 is preferably provided. This further compressor can be an intercooled compressor and it can be used to bring the gas at a very high pressure (for example about 100 bar or more).

The energy storage system 10 can also include a turbine 25 (in a way for using the compressed gas) connected between the thermal energy storage 12 and the heat recuperator 15 (this turbine 25 is advantageously connected in parallel to the compressor 11).

The turbine 25 can expand the gas coming from the reservoir 13 and heated in the heat recuperator 15 and thermal energy storage 12.

If more thermal energy storages 12*a-c* are provided, a plurality of turbines 25*a-c* is preferably provided.

In particular the turbines 25*c* is connected between the outlet of the thermal energy storage 12*c* and the inlet of the thermal energy storage 12*b* and the turbines 25*b* is connected between the outlet of the thermal energy storage 12*b* and the inlet of the thermal energy storage 12*a* (inlet and outlet during discharge of the reservoir 13). Then another turbine 25*a* is provided between the thermal energy storage 12*a* and the heat recuperator 15.

These turbines 25*a-c* are preferably connected in parallel to the compressors 11*a-c*.

Different possibilities exist for the thermal storage medium; in a preferred example the thermal storage medium includes or is molten salt; other examples of thermal storage medium anyhow exist.

For example the molten salt can be a mixture of sodium and potassium nitrate; anyhow other examples of salt exist.

The given temperature is preferably comprised in the range 280-320° C. and more preferably it is about 300° C., because the aforementioned molten salt is liquid above this temperature but is becomes solid below this temperature.

The operation of the energy storage system is apparent from that described and illustrated and is substantially the following.

Figure 8:
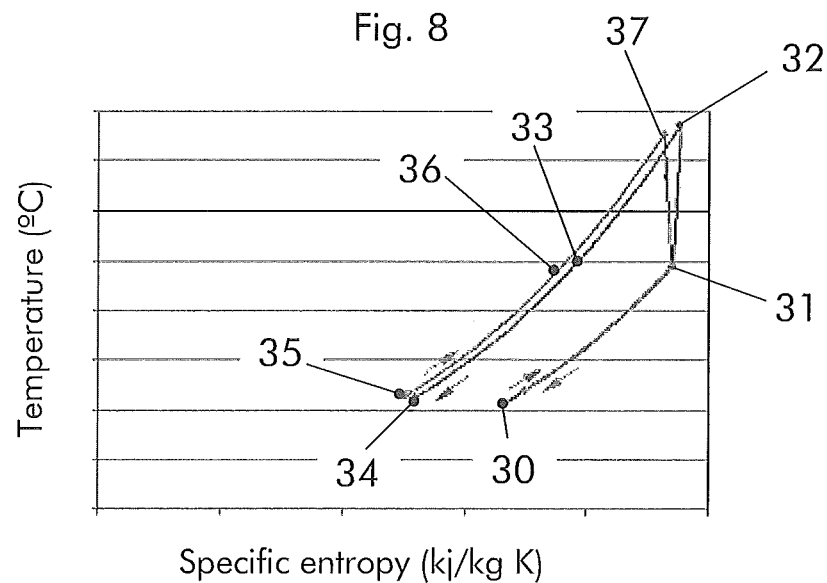
FIG. 8 shows the gas transformations implemented within the energy storage system of FIGS. 3 and 4 in a temperature-entropy diagram.

With reference to FIG. 8, the gas at atmospheric pressure and temperature (1 bar, 25° C., reference 30) is supplied to the heat recuperator 15 where passing through the path 17 it increases its temperature at a substantially constant pressure; for example at the outlet of the heat recuperator 15 the pressure of the gas can be about 1 bar (negligible pressure drop through the heat recuperator 15) and the temperature about 300° C. (reference 31).

Then the gas is supplied to the compressor 11 where it is compressed; the temperature (due to the compression) increases during compression. For example the pressure at the outlet of the compressor is about 4 bar and the temperature about 550° C. (reference 32).

The compressed gas is then supplied into the thermal energy storage 12, to be cooled by the thermal storage medium. At the outlet of the thermal energy storage 12 the pressure of the gas can be about 4 bar (negligible pressure drop) and about 300° C. (reference 33). At the same time the thermal storage medium is accumulated at high temperature in the hot tank 52, for example the temperature of the thermal storage medium in the hot tank is about 550° C.

Thus the gas is supplied to the path 16 of the heat recuperator 15, and at the outlet of the heat recuperator 15 it has a pressure of about 4 bar (negligible pressure drop) and about 25° C. (reference 34); at the same time the gas coming from the environment is heated from about 25° C. to about 300° C.

The gas is thus supplied to the further compressor 23 where it is compressed to be stored into the reservoir 13 such as a cave; for example at the outlet of the compressor 23 the gas has a pressure of about 100 bar and a temperature of about 25° C. (reference 35).

FIG. 8 also shows a possible way of using the compressed gas.

The gas is preferably expanded in a throttle valve 29 in parallel to the compressor 23 and it is then sent to the path 16 of the heat recuperator 15 where it is heated. For example at the inlet of the heat recuperator 15 the pressure of the gas can be 4 bar and the temperature of the gas about 25° C. (reference 35) and at the outlet of the heat recuperator 15 the pressure of the gas can be about 4 bar (negligible pressure drop) and the temperature of the gas about 300° C. (reference 36).

Thus the gas is conveyed into the thermal energy storage 12, where the thermal storage medium passes from the hot tank 52 to the cold tank 51 and it is used to heat up the gas. For example the gas at the outlet of the thermal energy storage 12 has a pressure of about 4 bar (negligible drop pressure) and about 550° C. (reference 37); in addition the temperature of the thermal storage medium within the cold tank 51 can be about 300° C.

The gas is thus supplied into the turbine 25 to be expanded and gather mechanical power (used for example to drive an electric generator). At the outlet of the turbine 25 the gas has a pressure of about 1 bar and a temperature of about 300° C. (reference 31).

Thus the gas enters the heat recuperator 15 (path 17) where it is used to heat up the gas coming from the reservoir 13. At the outlet of the heat recuperator 15 the gas can have a pressure of about 1 bar and a temperature of about 25° C. (reference 30).

In order to increase the gas pressure at the inlet of the heat recuperator 15 and thus at the inlet of the compressor 23 (thus to reduce the pressure increase at the compressor 23), the gas can be compressed and cooled by the thermal storage medium a plurality of times before it is conveyed to the recuperator 15.

Figure 9:
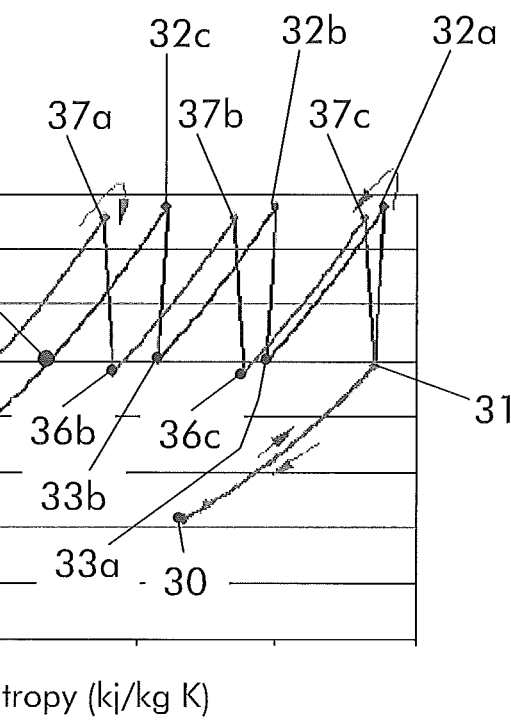
FIG. 9 shows the gas transformations implemented within the energy storage system of FIGS. 6 and 7 in a temperature-entropy diagram.

With reference to FIG. 9, the gas from the heat recuperator 15 is supplied to the compressor 11*a* (reference 32*a*) and then to the thermal energy storage 12*a*. From the outlet of the thermal energy storage 12*a* (pressure about 4 bar and temperature about 300° C., reference 33*a*) the gas is conveyed to the compressor 11*b* to be further compressed. For example the pressure at the outlet of the compressor 11*b* is about 16 bar and the temperature about 550° C. (reference 32*b*). Thus from the compressor 11*b* the gas is conveyed into the thermal energy storage 12*b* to be cooled again. For example the pressure at the outlet of the thermal energy storage 12*b* is about 16 bar (negligible drop pressure) and the temperature about 300° C. (reference 33*b*).

As many steps including compression in compressors 11*b*, *c*, ... and cooling in thermal energy storages 12*b*, *c*, ... can be included. For example two such steps can be included (but only one additional compressing and cooling step or more than two can be provided). For example, at the outlet of the compressor 11*c* the pressure of the gas can be about 64 bar and the temperature about 550° C. (reference 32*c*) and at the outlet of the thermal energy storage 12*c* the pressure can be about 64 bar (negligible drop pressure) and the temperature about 300° C. (reference 33*c*).

In the preferred embodiment, the thermal storage medium passes in the thermal energy storages 12*a-c* in parallel and is accumulated in the common hot tank 52, at a temperature of about 550° C.

In order to use the compressed gas accumulated in the reservoir 13, the gas moves out of the reservoir 13 and reaches the heat recuperator 15 (preferably it passes through the throttle valve 29 to reduce its pressure).

Thus the gas is conveyed into the thermal energy storage 12*c* where it is heated up by the thermal storage medium and it is then expanded in the turbine 25*c*. For example the pressure at the inlet of the heat recuperator 15 can be about 64 bar and the temperature about 30° C. (reference 36*a*), at the outlet of the thermal energy storage 12*c* the pressure is about 64 bar (negligible drop pressure) and the temperature about 550° C. (reference 37*a*) and at the outlet of the turbine 25*c* the pressure can be about 16 bar and the temperature about 300° C. (reference 36*b*).

The sequence of heating and expansion can be repeated a number of times; for example with reference to FIG. 9 these steps are defined by:

references 37*b* (outlet of thermal energy storage 12*b*; pressure 16 bar and temperature 550° C.), reference 36*c* (outlet of turbine 25*b*; pressure 4 bar and temperature 300° C.), references 37*c* (outlet of thermal energy storage 12*a*; pressure 4 bar and temperature 550° C.), reference 31 (outlet of turbine 25*a*; pressure 1 bar and temperature 300° C.).

It is clear that in the above description the drop pressure has been considered negligible, the pressure needed for circulation has also been considered negligible and the differential temperatures for heat transfer have been considered negligible.

In addition only three steps of compression and cooling and three corresponding steps of heating and expansion are described; it is clear that the number of steps can be any such as one or more than three.

Advantageously, the energy storage system of the present disclosure has a limited operating temperature range at the thermal energy storage 12 and to keep a high efficiency, heat outside of this range is exchanged at the heat recuperator 15. This way the thermal energy storage 12 can be optimised and the thermal storage medium operating temperature range can be optimised as well.

In the following some specific examples of energy storage systems are described in detail.

EXAMPLE 1

The first example of energy storage system 10 is shown in FIGS. 3 through 5. FIG. 3 shows the system 10 and the components thereof used when compressing and storing the gas, FIG. 4 shows the system 10 and the components thereof used when using the compressed gas and FIG. 5 shows a possible embodiment with all components. In addition FIGS. 3 and 4 also show possible pressure and temperature of the gas and thermal storage medium.

FIG. 3 shows the heat recuperator 15 with its paths 17 connected to the compressor 11 that is in turn connected to the thermal energy storage 12. The outlet of the thermal energy storage 12 is connected to the path 16 of the heat recuperator 15 and the outlet of the path 16 is in turn connected to the compressor 23. The compressor 23 is connected to the reservoir 13 such as a cave.

FIG. 4 shows the reservoir 13 connected through the throttle valve 29 to the path 16 of the reservoir 15 that is in turn connected to the thermal energy storage 12. The thermal energy storage 12 is connected to the turbine 25 that is in turn connected to the path 17 of the heat recuperator 15.

FIG. 5 shows that the compressor 23 and throttle valve 29 can be connected in parallel (naturally control valves are also provided to drive the flow through the correct components) and the compressor 11 and turbine 25 are also preferably connected in parallel; also in this case control valves are preferably provided to drive the flow through the correct components. In addition, FIG. 5 also shows a motor 55 connected to the compressor 11 and an electric generator connected to the turbine 25.

EXAMPLE 2

Figure 6:
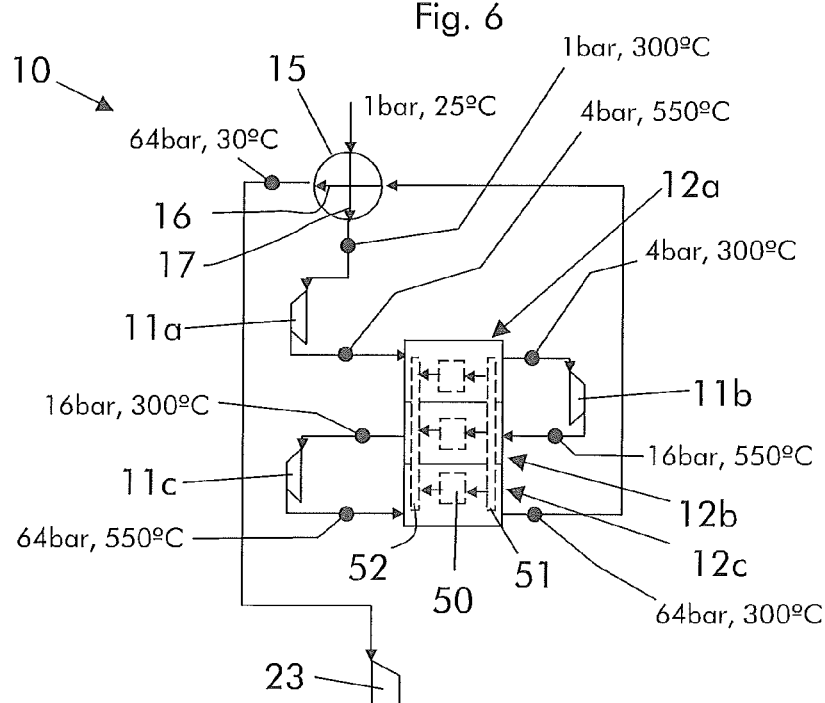
FIGS. 6 and 7 are schematic views of another embodiment of the energy storage system.
Figure 7:
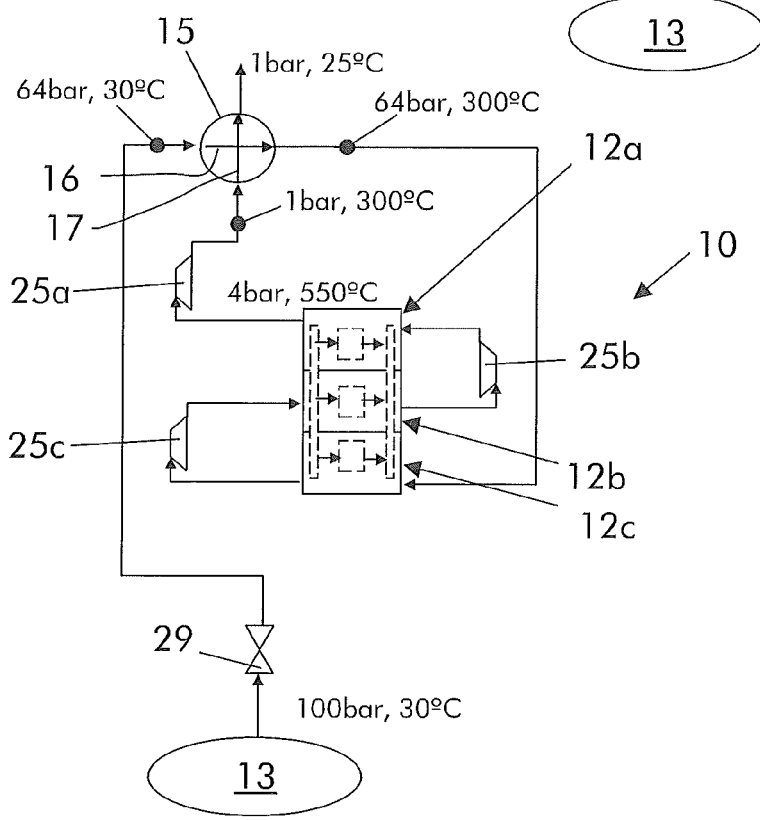

FIGS. 6 and 7 shows an example with compression and heat accumulation occurring in a number of stages. FIGS. 6 and 7 also show possible pressure and temperature of the gas and thermal storage medium.

For example FIGS. 6 and 7 show the common cold tank 51 and hot tank 52 that supply the thermal energy storages 12*a-c* in parallel. In addition, between the thermal energy storages 12*a-c* the compressor 11*a-c* are provided.

Method

The present disclosure also refers to a method for energy storage.

The method comprises:

compressing a gas in a compressor 11, cooling the gas coming from the compressor 11 to a given temperature by heating the thermal storage medium to store thermal energy in a thermal energy storage 12, storing the compressed gas, further cooling the compressed gas coming from the compressor 11 below the given temperature and heating the gas supplied to the compressor 11.

In addition, according to the method cooling the gas comprises a plurality of cooling, and between two cooling the gas is further compressed.

When energy is recovered the method comprises:

extracting the compressed gas from a reservoir 13, heating the gas coming from the reservoir 13 by cooling a thermal storage medium to recover thermal energy in a thermal energy storage 12, expanding the gas in a turbine 25.

In particular, the method also comprises the step of heating the compressed gas coming from the reservoir 13 to a given temperature by cooling the gas discharged from the turbine 25, and then conveying the gas to the thermal energy storage 12.

In a preferred embodiment, heating the gas comprises a plurality of heating, and between two heating the gas is expanded.

Naturally the features described may be independently provided from one another.

In practice the materials used and the dimensions can be chosen at will according to requirements and to the state of the art.

What is claimed is:

1. An energy storage system, the energy storage system comprising:
a compressor for compressing a gas,
a thermal energy storage for cooling the gas coming from the compressor to a given temperature by heating a thermal storage medium to store thermal energy,
a heat recuperator for further cooling the gas coming from the compressor, and
a reservoir for storing the compressed gas that has been cooled in the heat recuperator,
wherein the compressed gas is further cooled below the given temperature by heating the gas supplied to the compressor using the heat recuperator.

2. The energy storage system according to claim 1, wherein the thermal energy storage includes:
a plurality of thermal energy storages,
and further comprising another compressor connected to an outlet of one of the plurality of thermal energy storages and an inlet of another of the plurality of thermal energy storages, the another compressor for compressing the gas.

3. The energy storage system according to claim 2, wherein the thermal storage medium passes through the thermal energy storages in parallel.

4. The energy storage system according to claim 2, wherein each of the plurality of thermal energy storages has a heat exchanger and common hot tanks and cold tanks.

5. The energy storage system according to claim 1, further comprising another compressor connected between the heat recuperator and the reservoir.

6. The energy storage system according to claim 1, further comprising:
a turbine connected between the thermal energy storage and the heat recuperator, whereby the turbine is provided for expanding the gas coming from the reservoir and heated in the heat recuperator and thermal energy storage.

7. The energy storage system according to claim 2, further comprising a plurality of turbines, each turbine connected to an outlet of one of the plurality of thermal energy storages and an inlet of another of the plurality of thermal energy storages, whereby each turbine is provided for expanding the gas contained in the reservoir.

8. The energy storage system according to claim 2, further comprising a plurality of turbines, wherein each turbine of the plurality of turbines is provided in parallel with one of the compressor and the another compressor.

9. The energy storage system according to claim 1, wherein the thermal storage medium includes molten salt.

10. The energy storage system according to claim 1, wherein the given temperature is comprised in the range 280-320° C. and preferably it is about 300° C.

11. The energy storage system according to claim 1, wherein the heat recuperator has path connected to the thermal energy storage and another path connected to the compressor.

12. A method for energy storage comprising
compressing a gas in a compressor,
cooling the gas coming from the compressor to a given temperature by heating a thermal storage medium to store thermal energy,
further cooling the compressed gas coming from the compressor below the given temperature by heating the gas supplied to the compressor using a heat recuperator, and
storing the compressed gas after the further cooling of the compressed gas by the heat recuperator.

13. The method of claim 12, wherein cooling the gas comprises a plurality of cooling steps, and compressing the gas between the cooling steps.

14. A method for energy storage comprising:
extracting a compressed gas from a reservoir,
heating the gas coming from the reservoir by cooling a thermal storage medium to recover thermal energy in a thermal energy storage,
expanding the gas in a turbine and discharging the gas,
heating the compressed gas coming from the reservoir to a given temperature by cooling the gas discharged from the turbine using a heat recuperator, and
conveying the gas discharged from the turbine to the thermal energy storage.

15. The method of claim 14, wherein heating the gas from the reservoir by cooling the thermal storage medium comprises a plurality of heating steps, and expanding the gas between the steps of the plurality of heating steps.

* * * * *